United States Patent
Zivny et al.

(10) Patent No.: US 9,130,751 B2
(45) Date of Patent: Sep. 8, 2015

(54) METHODS AND SYSTEMS FOR ANALYZING DECOMPOSED UNCORRELATED SIGNAL IMPAIRMENTS

(75) Inventors: Pavel R. Zivny, Portland, OR (US); Maria Agoston, Beaverton, OR (US); Kan Tan, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 632 days.

(21) Appl. No.: 13/337,052

(22) Filed: Dec. 24, 2011

(65) Prior Publication Data
US 2012/0226727 A1    Sep. 6, 2012

Related U.S. Application Data

(60) Provisional application No. 61/448,574, filed on Mar. 2, 2011.

(51) Int. Cl.
*G06F 17/10* (2006.01)
*H04L 1/20* (2006.01)

(52) U.S. Cl.
CPC ................................... *H04L 1/205* (2013.01)

(58) Field of Classification Search
None
See application file for complete search history.

(56) References Cited

U.S. PATENT DOCUMENTS

| | | | |
|---|---|---|---|
| 7,522,661 B2 | 4/2009 | Nelson | |
| 7,899,638 B2 | 3/2011 | Miller | |
| 8,660,811 B2* | 2/2014 | Miller | 702/86 |
| 2007/0136012 A1* | 6/2007 | Miller | 702/67 |
| 2011/0119536 A1* | 5/2011 | Miller | 714/704 |
| 2011/0292987 A1 | 12/2011 | Zivny | |
| 2012/0226727 A1* | 9/2012 | Zivny et al. | 708/290 |

* cited by examiner

*Primary Examiner* — David H Malzahn
(74) *Attorney, Agent, or Firm* — Marger Johnson; William K. Bucher (57) ABSTRACT

Method and systems are described for estimating signal impairments, in particular jitter that includes uncorrelated, non-periodic signal impairments. One system may take the form of an oscilloscope. The estimates may take the form of a probability density function (PDF) for uncorrelated signal impairments that has been modified to replace low probability regions with a known approximation and an extrapolation of the known approximation.

2 Claims, 8 Drawing Sheets

METHODS AND SYSTEMS FOR ANALYZING DECOMPOSED UNCORRELATED SIGNAL IMPAIRMENTS

RELATED APPLICATIONS

This application claims the benefit of priority of U.S. Provisional Application No. 61/448,574 filed Mar. 2, 2011 and incorporates by reference herein the contents of U.S. Provisional Application No. 61/448,574 as if such contents were set forth in full herein. This application is also related to U.S. Non-Provisional application Ser. No. 13/081,369 filed Apr. 6, 2011 and incorporates by reference herein the contents of U.S. Non-Provisional application Ser. No. 13/081,369 as if such contents were set forth in full herein. To the extent that any of the disclosure in U.S. Non-Provisional patent application Ser. No. 13/081,369 conflicts or appears to conflict with the disclosure of the present specification, the disclosure of the present specification shall take precedence and govern the resolution of any such conflict.

BACKGROUND

In the field of high-frequency (e.g., 1 to 40 gigabits/second (Gb/s)) telecommunications and data communications, a signal that is transmitted from one location to another may become degraded due to a number of factors. Such factors are generally referred to as signal impairments. Two types of signal impairments are jitter and noise. Jitter and noise may be caused by various types of sources, such as electromagnetic interference, crosstalk, data-dependent effects, random sources, and so forth.

In general, jitter may be identified on the horizontal axis of an oscilloscope (typically measured in units of time), while noise may be identified on the vertical axis of an oscilloscope (typically measured in units of voltage). In slightly more detail, the term jitter refers to the horizontal displacement from an ideal position of various aspects of pulses of a signal or waveform, such as, for example, the displacement of various aspects of pulses of a signal or waveform within the time domain, phase timing, or the width of the pulses themselves. The term noise refers to the vertical displacement of various aspects of pulses of a signal or waveform, such as for example amplitude error in the signal or other vertical noise effects.

Jitter and noise may be "decomposed" (e.g., separated) into various components in order to aid in the analysis of the total impairment of a communications link or an associated system (e.g., transmitter, receiver, transmitter and receiver pair, electronic device or component, etc.), as well as to extrapolate or predict impairments that are typically associated with events of low probability. Conventional approaches for decomposing jitter include separating deterministic jitter (DJ) from random jitter (RJ), extrapolating lower probability events by "reassembling" or convolving the jitter components to analyze total jitter at a specific bit error rate (BER), sometimes referred to as TJ@BER. Similar methods of decomposition can be applied to noise as well. Complete two-dimensional probability waveforms or eye diagrams may be developed by combining those two orthogonal distributions.

Figures 1, 2:
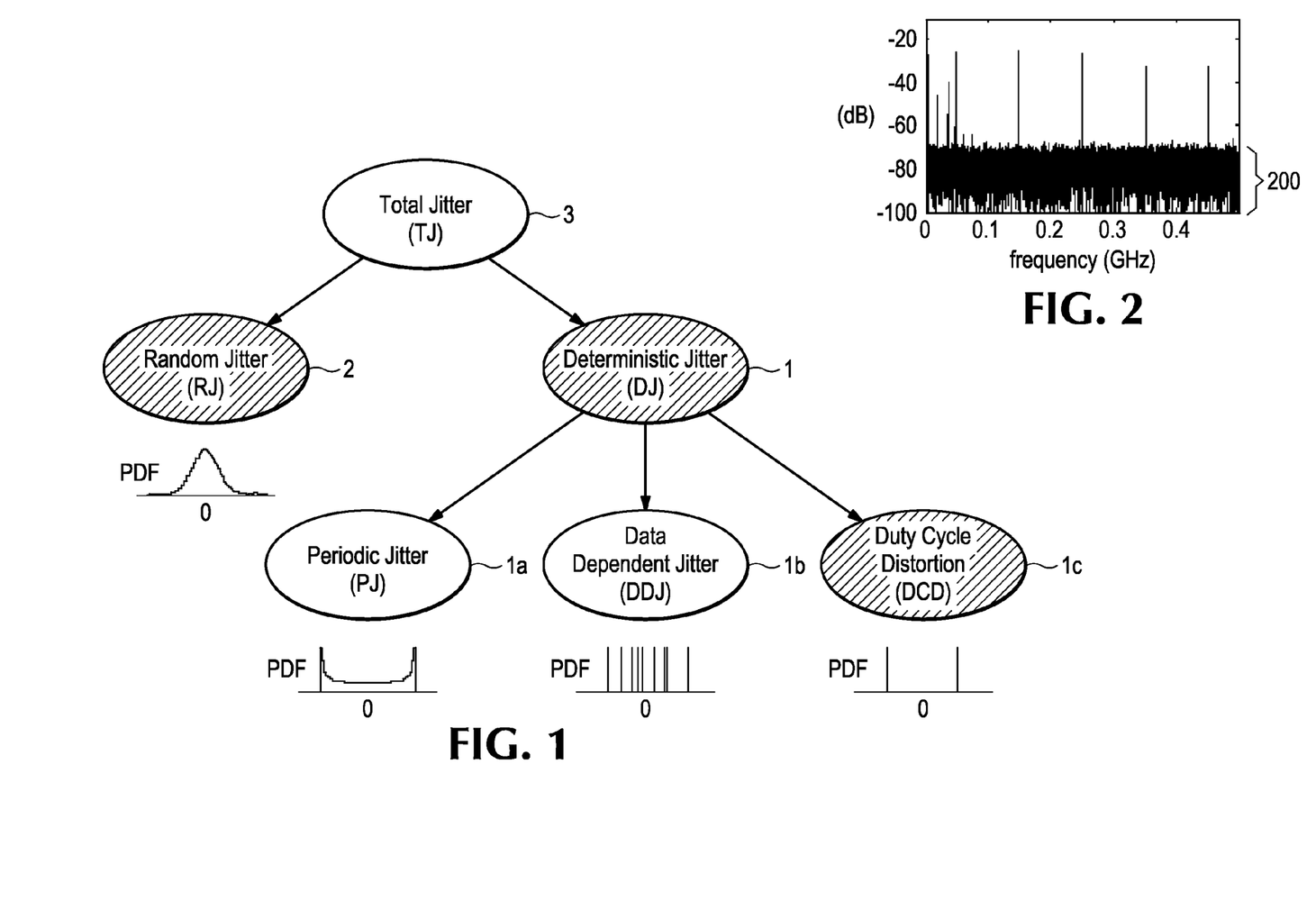
FIG. 1 is a simplified illustration of a conventional, standard model used to explain the decomposition of jitter components in signal analysis.
FIG. 2 is a plot of jitter (on a log scale), as a function of frequency, showing the presence of spikes (deterministic jitter) above a "floor" component of random jitter.

FIG. 1 illustrates the decomposition of total jitter. As shown, deterministic jitter (DJ) 1 may be comprise: (1) periodic jitter (PJ) 1a, which may include periodic variations of signal edge positions over time; (2) data-dependent jitter (DDJ) 1b, which may be dependent on the bit pattern being transmitted within a given signal, including inter-symbol interference (ISI); and (3) duty cycle distortion (DCD) 1c, which may be dependent on transitions between symbols in a given data pattern. While deterministic jitter 1 may be completely characterized, the remaining component of total jitter 3, referred to as random jitter 2, can only be described by its statistical properties, e.g. a distribution. This is sufficient, however, to perform an accurate analysis of the impairments associated with a given signal.

FIG. 2 is an illustration of the so-called "spectral" approach to the analysis of jitter. A jitter spectrum is displayed, for example, using a logarithmic vertical scale measured in decibels (dB) and a horizontal scale showing jitter modulation frequency in gigahertz (GHz). The spectrum can be seen to contain a number of prominent spikes, some appearing at regular frequency intervals and others at apparent random locations. These spikes correspond to deterministic jitter. In a known spectral approach, the remaining spectral "floor" 200 is assumed to be composed entirely of random jitter with a Gaussian probability distribution.

One limitation of the spectral approach or methodology is that it appears to require a repeating pattern, at least to some degree. Another limitation is that the presumption that the random jitter in the "floor" 200 is best represented by a Gaussian probability distribution is not always valid. For example, jitter associated with crosstalk may be non-periodic and uncorrelated with a given data pattern, while possessing a bounded probability distribution. The consequence of mistaking bounded jitter for unbounded (i.e., random) jitter is particularly severe, especially when jitter measurements are extrapolated and used to measure the performance of a communication link or device at low bit rates. Said another way, the spectral approach may fail to isolate random jitter from other forms of uncorrelated jitter when, for example, crosstalk is present. As is known in the art, crosstalk occurs between high-speed channel links, and is mostly characterized as bounded noise. In its most general form, it is uncorrelated to the data streams within the links (i.e., the links being analyzed). When at least some of the crosstalk spectral lines broaden and flatten they may become undistinguishable from the jitter spectral floor 200. This increase in the noise and jitter floors (such as floor 200 in FIG. 2) makes the components of crosstalk indistinguishable from residual, random elements.

In sum, while the spectral approach may identify and remove periodic jitter components, non-periodic, uncorrelated jitter components may remain. One result is that random jitter measurements may be severely inaccurate (i.e., overestimated) which, in turn, results in inaccurate (i.e., overly pessimistic) estimates of TJ@BER.

Similar problem exist in other methods as well (i.e., other than the spectral method). For example, a different approach, referred to as a "correlation method", is directed at the separation of jitter components of a data stream even when an associated data pattern is unknown or non-repeating. In particular, the correlation approach measures Time Interval Errors (TIE) of the data stream, estimating ISI and DCD associated with the data pattern and then subtracting out the ISI and DCD components from the measured TIE. A spectral approach may then be used to separate the remaining TIE into periodic and random components. In contrast to the "repeating pattern" requirement illustrated by the spectral approach, however, the correlation method may be useful even when a waveform carries a non-repeating data pattern. Further, the correlation method may be combined with the spectral approach such that the correlation method identifies and removes jitter associated with data dependency, after which the spectral method identifies the jitter associated with other deterministic processes. Unfortunately, however, random (but bound) jitter that is mixed with unbound Gaussian jitter cannot be separately identified.

U.S. Pat. No. 7,899,638 entitled "Estimating Bit Error Rate Performance of Signals", issued to M. Miller on Mar. 1, 2011 (referred to as Miller) appears to describe an estimated cumulative distribution function (CDF) method, where an estimate of the TIE's probability density function (PDF) may be obtained from a TIE histogram. Because it is known that Gaussian, random jitter is only dominant in the unbounded left and right extremes of Miller's PDF, the standard deviation of this random jitter may be estimated by varying the standard deviation of a Gaussian jitter model and comparing the results to the measured distribution.

Figure 3A:
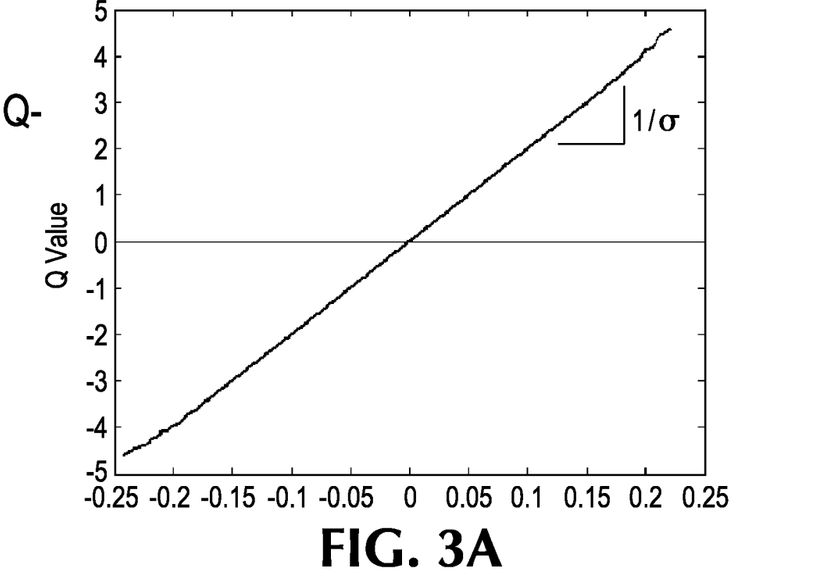
FIGS. 3(A) and (B) contain two plots in Q-space of a cumulative distribution function (CDF) of a signal, the plot in FIG. 3(A) being essentially Gaussian, which is depicted as linear in Q-space, and the plot in FIG. 3(B) containing both Gaussian components and non-Gaussian components.
Figure 3B:
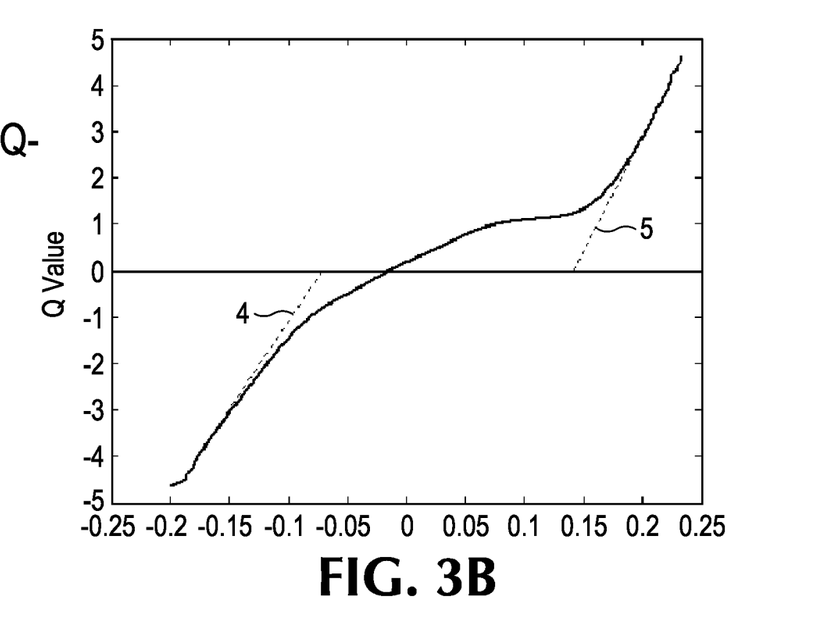

In one specific implementation, a histogram (i.e., sampling of the PDF) may be mathematically integrated to form an estimated CDF, which is then plotted using the so-called Q-scale. As is known, the Q-scale is a mathematical transformation of the CDF's probability axis, such that a Gaussian distribution may be plotted as a straight line with a slope inversely related to its standard deviation. Once the estimated CDF is plotted on the Q-scale, straight lines may be fit to the left and right asymptotic regions (according to a predefined minimization criteria), where the slope of the lines may reveal the standard deviation of the Gaussian distributions. This process is illustrated by FIGS. 3(A) and (B), which show two simulated data sets for which this process may be applied. In each case, the darker line is an estimated CDF derived from a histogram of measured TIE values. In FIG. 3(A), the data set is from a random process with a (solely) Gaussian distribution. Once plotted on the Q-scale, this distribution approximates a straight line, having a slope equal to $1/\sigma$, where $\sigma$ is the standard deviation of the Gaussian distribution. In FIG. 3(B), the data set includes multiple uncorrelated bounded distributions, as well as at least one Gaussian distribution. The two dotted lines 4, 5 may be used to indicate that linear fits may be made to the asymptotic extremes of the CDF, as a means of estimating the standard deviation, $\sigma$, of the Gaussian model parameter for this data set.

However, there are several limitations to Miller's "estimated CDF" method. For example, the method appears to only provide a way to model Gaussian and aggregated deterministic components; no modeling parameters are presented to model or estimate individual bounded jitter components that may be present. Further, the presence of multiple bounded components (which typically make up a majority of the jitter being observed, especially when crosstalk is present) may bias attempts to accurately measure the standard deviation, $\sigma$, of the relatively small Gaussian components. For example, multiple uncorrelated bound distributions may combine into a distribution that has extremes resembling a Gaussian distribution (i.e., see the well known "Central Limit Theorem"). The more (uncorrelated, bound signal impairment) components are present, the closer the resemblance. This makes the separation or distinctions error-prone.

Heretofore, the limitations discussed above have prevented the total jitter of a given signal or waveform to be measured accurately. Lacking accurate estimates, it is difficult to diagnose the source of jitter much less design a communications system that minimizes or prevents jitter from interfering with the quality and integrity of signals within such a system.

One approach to addressing these limitations is described in U.S. application Ser. No. 13/081,369 (referred to as the '369 application), mentioned above and assigned to the same assignee as the present application. As described in the '369 application, jitter is decomposed into correlated and uncorrelated components, and the uncorrelated component is further decomposed into bounded, uncorrelated jitter and random (i.e., unbound) jitter, for example, by integrating a probability density function (PDF) of the residual jitter and analyzing the resulting cumulative distribution function (CDF) curve in Q-space.

While this approach overcomes some of the limitations discussed above, it does not address the circumstance where unbound (random) components and some bound, uncorrelated components of signal impairments may co-exist. More particularly, because the unbound component is very difficult to separate from the bound component, it cannot be easily replaced by a desired, unbound component's PDF (e.g., an ideal or near-ideal PDF that includes very low probabilities, far from the mean). Collectively, the combination of the unbound (random) component and bound, non-periodic uncorrelated component of signal impairment(s) may be referred to herein as "residual jitter".

SUMMARY

In accordance with embodiments of the present invention, uncorrelated, bounded non-periodic jitter components and an unbounded, random jitter component are included in an analysis of so-called residual jitter. Heretofore, the uncorrelated, bounded non-periodic component was largely ignored—leading to exaggerated values of BER, particularly in the presence of crosstalk between signals.

In particular, the present invention provides methods and related systems (e.g., an oscilloscope) for estimating a probability density function (PDF) for uncorrelated signal impairments (e.g., including non-periodic, uncorrelated jitter or alternatively, noise components). An exemplary embodiment of such a method and related system comprises: modifying a compound distribution representing acquired data that comprises uncorrelated signal impairments by: (a) identifying low probability regions in the distribution; (b) identifying a known approximation that models a distribution of the low probability regions; (c) removing the low probability regions; and (d) replacing the low probability regions with the known approximation and an extrapolation of the known approximation, where the known approximation may be a modeled, polynomial approximation, or a polynomial approximation having a Gaussian distribution in Q space when the compound distribution is integrated to generate a cumulative distribution function (CDF) estimate.

In a further embodiment of the invention the CDF estimate may be converted into a modified PDF distribution, and, thereafter the modified PDF distribution may be convolved with a data-dependent deterministic PDF in order to calculate an accurate estimate of total jitter that includes a total jitter distribution and a total jitter value at a specified bit error rate.

In still a further embodiment of the invention, the method and related system may: (i) identify lower probability regions of the compound distribution of uncorrelated signal impairments, whose probability of occurrence of impairments is lower than a probability of occurrence of impairments within a central region of the distribution; (ii) determine that the probability of occurrence of the impairments within the lower probability regions is sufficiently characterized by the acquired data to model the lower probability regions as the known approximation; (iii) identify lowest probability regions of the compound distribution of uncorrelated signal impairments, whose probability of occurrence of impairments is lowest than a probability of occurrence of impairments within the central region of the estimate and insufficiently represented by the acquired data; and (iv) replace the lower probability region with the known approximation and replacing the lowest probability region with at least an extrapolation of the known approximation.

In the embodiments directed at the related system, such a system may comprise a controller operable to execute instructions for completing the exemplary methods set forth above.

It should be understood that while the discussion that follows may be described in terms of the decomposition and analysis of jitter impairments, the same or substantially similar methods and related systems may be applied to noise impairments.

Other and further aspects and advantages of the present invention will become apparent during the course of the following discussion and by reference to the accompanying drawings.

BRIEF DESCRIPTION OF THE DRAWINGS

Referring now to the drawings.

DETAILED DESCRIPTION, WITH EXAMPLES

As mentioned above, it is difficult to properly identify and analyze the various components of unbounded (random) signal impairments, particularly in the presence of crosstalk. The present invention addresses this problem in the manner discussed above and below, by identifying and separating the contributing factors—both conventional, "random" jitter (i.e., the unbounded component) and remaining, bounded components of uncorrelated non-periodic jitter (a contributor to jitter in the presence of crosstalk), where the non-periodic jitter is a component decomposed from bounded, uncorrelated jitter (BUJ). Again, as a reminder to the reader, though the discussion that follows may be described in terms of the decomposition and analysis of jitter impairments, the same or substantially similar methods and related systems may be applied to noise impairments.

More particularly, while the inventive techniques disclosed herein are generally discussed in the context of jitter rather than noise, the embodiments of the invention disclosed herein can be used to decompose, isolate, convolve, and/or analyze either jitter or noise, or both, associated with a signal or waveform. In sum, the following discussion of jitter should be considered as merely exemplary of a specific type of signal impairment.

Prior to describing the details of embodiments of the inventive methodologies, an embodiment of a related system that may be used to implement such methodologies will be briefly described.

Figure 4A:
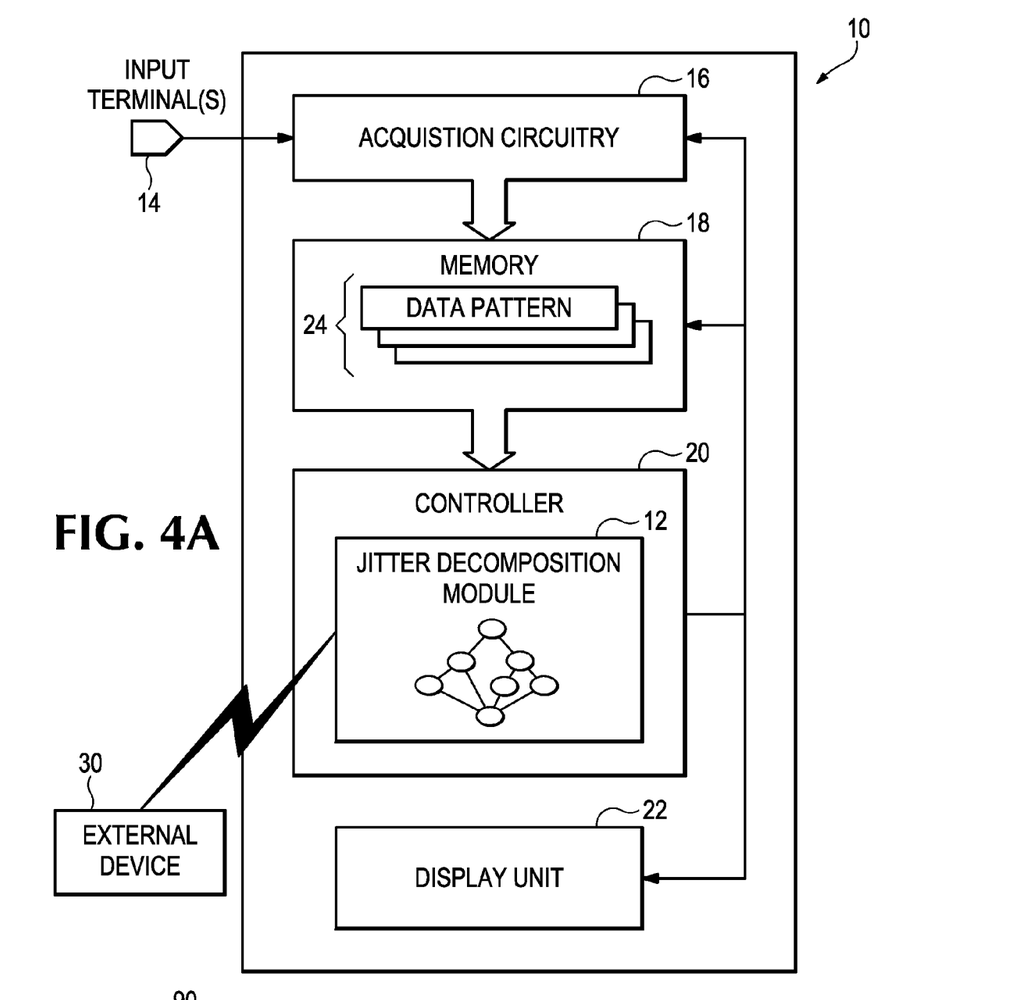
FIG. 4A illustrates a simplified block diagram of one embodiment of system that includes a jitter decomposition module for impairment analysis according to embodiments of the present invention.

FIG. 4A illustrates a simplified block diagram of one embodiment of a system 10, which may be an oscilloscope. In alternative embodiments of the invention the system 10 may comprise a spectrum analyzer, or a signal analyzer, some combination of the two, or another type of comparable test and measurement instrument or device or a simulation of such system whose function(s) is (are) substantially the same as system 10. In accordance with embodiments of the present invention, the system 10 may include jitter decomposition means or module 12. The system 10 may implement or include various exemplary embodiments of the present invention, which may be applied in a variety of ways and in a variety of different applications, including for example, the measurement and analysis of impairments associated with digital or analog signals (actual or simulated signals). The signals can be associated with, for example, high-frequency wired or wireless communication systems, high-speed memory or other logic circuits, storage devices, networks, may be simulated, and so forth. The system 10, and in particular module 12, may be used for precision decomposing, convolving, and/or analyzing either the jitter or noise impairment of a signal (actual or simulated), or both.

In one embodiment of the invention the oscilloscope 10 may include, for example, one or more input means 14 (for example, terminals), acquisition means 16, memory means 18, controller or control means 20 (including jitter decomposition means 12), and a display unit 22. Control means 20 and, more specifically, jitter decomposition means 12, alone or in combination with other components of oscilloscope 10, may implement or cause to be implemented any of the various embodiments of the present invention.

Oscilloscope 10 may have one, two, four, or any number of channels that are connected to input means 14, suitable for use with various embodiments as described herein. While components of oscilloscope 10 are shown to be directly coupled to each other, it should be understood that oscilloscope 10 may include a variety of other circuit or software components, inputs, outputs, and/or interfaces, which are not necessarily shown, but that are disposed between or otherwise associated with the illustrated components of oscilloscope 10.

One or more actual or simulated, analog or digital waveforms or electrical signals (collectively referred to as "signals") may be received at input means 14. Acquisition means 16 may include, for example, known electronic circuitry and/ or devices for at least receiving the signal from terminals 14, sampling the signal and converting the signal into digitized samples. The so "acquired data" may then be stored in memory means 18. The acquired data may include one or more data patterns 24. As used herein the term "acquired data" will be understood to include the reception of an original input signal, sampling of such a signal and the conversion of such a signal into digital samples or bits when the signal is an analog signal. Memory means 18 may be any suitable recordable medium or storage medium capable of storing the acquired data, including the one or more data patterns 24. Memory means 18 may, for example, take the form of RAM, ROM and/or cache memory. RAM memory may be operable to store volatile data, such as the acquired data and corresponding data patterns 24 generated by the acquisition means 14. If required or desired, the memory means 18 may also store one or more time interval error (TIE) values (not shown) for comparison with the one or more data patterns 24. Yet further, memory means 18 may also store executable instructions that may be accessed by control means 20.

Alternatively, the acquired data, corresponding data patterns 24, TIE values and executable instructions may be stored in a recordable medium separate from memory means 18.

Control means 20 may be operatively coupled to memory means 18 and display unit 22. Control means 20, and in particular the jitter decomposition module 12, may be operable to access and process acquired data from memory means 18 in order to generate corresponding jitter distributions, histograms, probability density function curves, cumulative distribution function curves, Q-space plots, traces and/or other jitter measurements, and all of the elements of the inventive methods and processes described herein, any and or all of which may be displayed by, and on, display unit 22. As indicated above, control means 20 may include the jitter decomposition module 12. Components of control means 20 and/or jitter decomposition module 12 may take the form of, or be implemented using, hardware, software, firmware, or by some combination thereof. For example, executable instructions for implementing the inventive methods and processes described herein and for otherwise controlling the oscilloscope 10 may be stored and accessed from memory means 18, more particularly, for example from a ROM, by processing means 20 which includes the jitter decomposition module 12. Alternatively, the executable instructions may be stored and accessed from external or internal mass storage media of a mass storage unit which in some embodiments may be included within memory means 18. The control means 20 may be implemented as, for example: one or more programmable microprocessors, such as those designed and developed by Intel Corporation; or multiple programmable controllers; and/or one or more programmable digital signal processors (may be collectively referred to as "controller" or "controllers" herein). In yet another embodiment, when the control means 20 is implemented using multiple controllers one may be used to control the acquisition and processing of input signals while the second may control the other operations of the oscilloscope 10. The oscilloscope 10 may be further controlled using a Windows® Operating System, such as Windows XP®, designed and developed by Microsoft, Corporation that is stored, for example, within associated memory means 18 and accessed, for example, by one or more controllers 20.

In some embodiments, control means 20 may exchange information related to impairments (e.g., jitter) with an external device 30 via a conductor such as a bus or a wire. External device 30 may include, for example, a computer separate from oscilloscope 10, or an external memory device (e.g., mass storage unit), among other possibilities. Control means 20 may transmit information concerning jitter analysis to external device 30, and/or receive information from external device 30 to enhance the jitter analysis performed by oscilloscope 10.

Figure 4B:
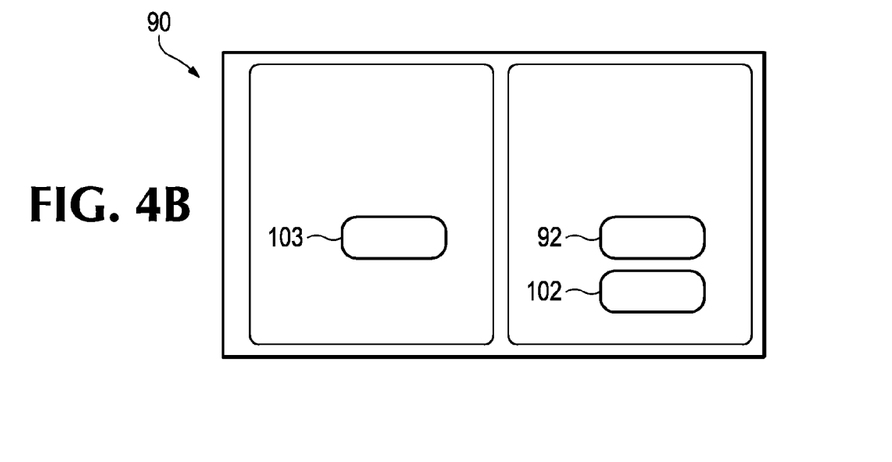
FIG. 4B illustrates a user interface that is a part of a system for activating and indicating completion of impairment analyses according to embodiments of the present invention.

Turning to FIG. 4B, there is depicted a user interface 90 that may be part of the system 10 for activating signal impairment analysis (e.g., estimation of a probability density function (PDF) for non-periodic, uncorrelated jitter), and for indicating when the analysis is completed. In one embodiment the user interface 90 may be a part of the display unit 22, and, thus, the display unit may be operable to display the user interface 90. In accordance with an embodiment of the invention, an activation icon 92 may be included in the interface 90 which when clicked with a mouse, touched with a finger or otherwise activated begins the process of executing the signal impairment methods and process(es) described herein. A save icon 102 may be selected to (e.g., clicked, touched) to save the results of such methods and processes, for example in memory means 18. The user interface 90 may also include icon 103 that may be displayed for indicating when the methods and processes described herein are completed. It should be understood that the positioning of the icons 92, 102 and 103 is only for illustrative purposes and that their position may be altered without changing their function or the scope of the invention. Further, though shown as three separate icons, one or more of the icons 92, 102 and/or 103 may be combined into as few as one icon (e.g., an icon that blinks at a certain rate depending on its function, or uses different colors depending on its function) or may be further separated into additional icons.

Figure 5:
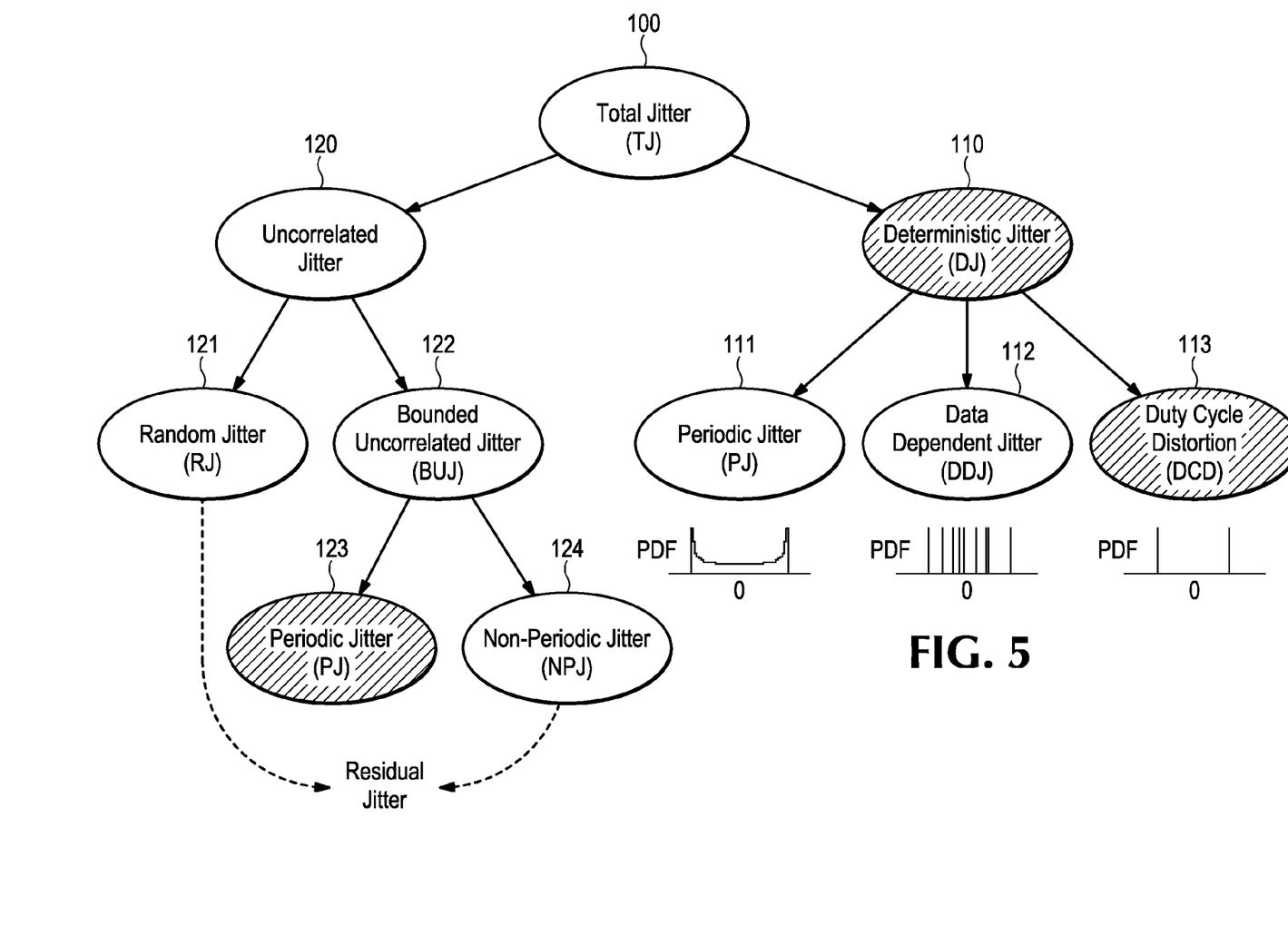
FIG. 5 is a variation of the standard decomposition model of FIG. 1 that illustrates an overview of a decomposition method associated with residual jitter in accordance with embodiments of the present invention.

FIG. 5 is a diagram which illustrates an overview of a decomposition method associated with residual jitter in accordance with embodiments of the present invention. As shown, the method involves separating total jitter 100 into deterministic (correlated) jitter 110 and uncorrelated jitter 120.

Deterministic jitter 110 includes the following components: periodic jitter 111, data-dependent jitter 112, and duty cycle distortion 113, all of which may be processed in a conventional manner.

The present invention is concerned with understanding and evaluating the components of uncorrelated jitter 120. As mentioned above, particularly in the presence of crosstalk, uncorrelated jitter will comprise both bounded and unbounded components. Therefore, any measurement that presumes that this component can merely be represented as Gaussian-distributed random (i.e., "unbound") jitter may improperly characterize total jitter @bit error rate (TJ@BER).

Uncorrelated jitter 120 may be decomposed into both random jitter 121 and bounded uncorrelated jitter (BUJ) 122 using, for example, the techniques set forth in U.S. application Ser. No. 13/081,369. Further, BUJ 122 may be further decomposed in the frequency domain into a periodic jitter (BPJ) component 123 and a non-periodic jitter (NPJ) component 124. Periodic component 123 may be converted from the frequency domain to the time domain, and studied in the same manner as the deterministic components using techniques known in the art.

What remains is to extract the remaining uncorrelated elements of jitter, namely, the bounded, uncorrelated non-periodic jitter (NPJ) component 124 and random jitter (RJ) 121 that is referred to as residual jitter herein in order to, ultimately, accurately estimate a total jitter at bit error rate (TJ@BER). In accordance with an embodiment of the invention, this may be accomplished by analyzing a compound probability density function estimate (PDFe), which includes information associated with both of these components.

Figure 6:
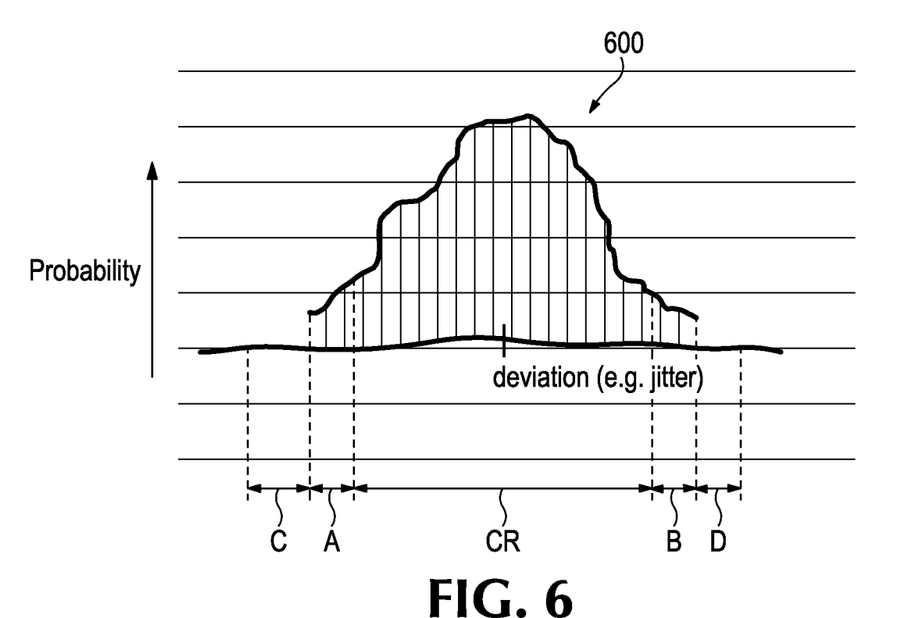
FIG. 6 is an estimated probability density function (PDFe) curve, in particular, a compound distribution curve including contributions from both an unbound (random), uncorrelated jitter component and a bound, uncorrelated jitter component according to an embodiment of the present invention.

FIG. 6 depicts an exemplary compound PDFe 600 of uncorrelated unbound and bound components (residual jitter) in accordance with an embodiment of the present invention. In this embodiment of the invention: 1) it is assumed that regions A-D of the PDFe 600 are indicative of low probability distribution behavior associated with random jitter components; 2) the random jitter distribution in regions A-D may be modeled or estimated as a single sigma ($\sigma$) Gaussian function (and generally different for the rise and fall edges of a given data pattern); 3) it is assumed that a statistically significant amount of data has been acquired by the acquisition means 16 in FIG. 4A, for example, and is able to populate bins representing low probability events; 4) it is assumed that a non-periodic jitter component exhibits a bounded distribution; and 5) it is assumed that jitter, including crosstalk-induced impairments, is stationary.

It should be noted here that, as is known in the art, a test and measurement instrument referred to as a bit error rate test set (BERT) may be used to measure a bit error rate. While BERTs offer the advantage of being able to sample large amounts of data associated with an incoming signal, thus making their measurement of BER highly accurate, the time it takes to complete such a measurement is sometimes unacceptably long for a given application. Thus, the ability to make BER computations using a relatively small, yet statistically significant amount of acquired data, using an oscilloscope or another comparable device offers significant advantages. Such computations must, however, be accurate in order to be reliable. In relation to the present invention this accuracy may be obtained by ensuring that the components of residual jitter in regions A-D are identified and accurately estimated.

Figure 9:
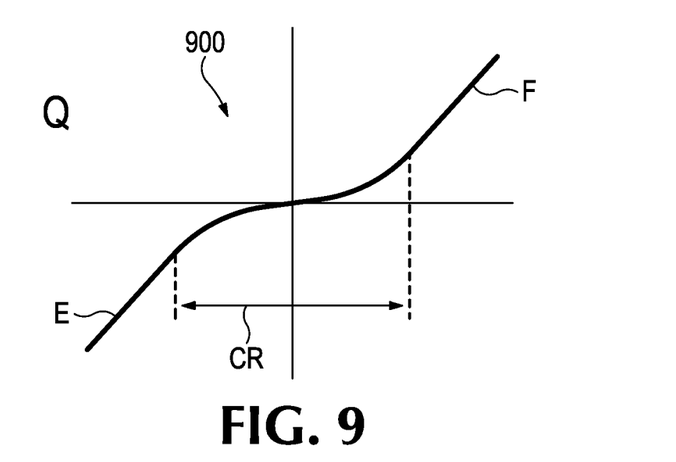
FIG. 9 is a CDFe formed in accordance with an embodiment of the present invention, where ideal, unbound distribution curves (straight lines in Q-space) are spliced into locations where the truncations are formed in FIG. 8.

Yet further, it should also be noted here that prior to the present invention, prior art techniques were unable to accurately model or convert the non-periodic, uncorrelated jitter impairments represented by regions A-D in FIG. 6—whose occurrence or probability is either:(a) lower when compared to the impairments represented by central region CR (regions A and B) or(b) the lowest when compared to central region CR (regions C and D) (collectively lower and lowest may be referred to as "low")—to regions which are associated with known, predictable distributions, such as regions E and F in FIG. 9. In the embodiment of FIG. 9, regions E and F may comprise linear polynomial approximations with slopes of $1/\sigma$ (i.e., Gaussian distributions).

In more detail, regions A and B in FIG. 6 represent regions that include impairments that may be modeled by polynomial approximations, such as linear polynomial approximations (e.g., when the PDFe is converted to a CDFe in Q-space) having a Gaussian distribution. Specifically, the acquired data used to create regions A and B represents impairments that have a lower probability of occurrence (i.e., distribution) than the central region CR. Even though their probability of occurrence is low, the present inventors discovered that the amount of acquired data from an input signal is enough for the controller 20, and in particular the jitter decomposition module 12, to process and determine that the probability distribution, though lower, can be modeled as a known approximation, such as a polynomial approximation (in Q-space, a linear polynomial approximation with a slope of $1/\sigma$ (e.g., Gaussian distribution).

The present inventors use this discovery to convert not only regions A and B, but also regions C and D of the PDFe estimate 600 into an estimate that accurately and properly describes unbounded, random impairments, and bounded, uncorrelated non-periodic (residual jitter) impairments. Further, though it is preferable for the PDFe 600 to already have had correlated and periodic jitter impairments removed, the inventive methods and related systems may also be applied to situations where some periodic jitter impairments remain.

In accordance with an embodiment of the invention, such an estimate may be generated as follows.

In an embodiment of the invention, given a compound distribution (e.g., PDFe 600 in FIG. 6) representing acquired data that includes uncorrelated unbound and bound components (residual jitter), such a compound distribution may be modified by: (a) identifying low probability regions in the distribution; (b) identifying a known approximation that models a distribution of the low probability regions; (c) removing the low probability regions; and (d) replacing the low probability regions with the known approximation.

By "known approximation" is meant, for example, a known probability model that is used to estimate an actual probability distribution of impairments in the low probability regions.

Regarding steps (a) and (b), the identification of low probability regions may include identifying "lower" probability regions, such as regions A and B in FIG. 6, whose probability of occurrence of impairments is lower than the probability of occurrence of impairments within a central region, CR, in FIG. 6. Once identified, the embodiments of the present invention may then determine that the probability of occurrence of the impairments within regions A and B, though lower than region CR, is nonetheless sufficient enough for the controller 20, and in particular the jitter decomposition module 12, to determine that the probability distribution can be modeled as a known approximation, such as a polynomial approximation (e.g., linear polynomial approximation with a slope of $1/\sigma$ (e.g., a Gaussian distribution). Said another way, the amount of data (probability distribution) that has been input and acquired by acquisition means 16, though low, is sufficient to allow the jitter decomposition module 12 to allow characterize the acquired data using a model of a known approximation (e.g., as a polynomial approximation, in particular a linear polynomial approximation having a Gaussian distribution when represented as a CDFe in Q-space).

In addition, steps (a) and (b) include the identification of "lowest" probability regions, such as regions C and D in FIG. 6, whose probability of occurrence of impairments is lowest when compared to the probability of occurrence of impairments within central region, CR, in FIG. 6. Once identified, in embodiments of the present invention, unlike regions A and B, the present inventors discovered that the probability of occurrence of impairments within regions C and D is too low to initially model these regions as a known approximation, such as a polynomial approximation. Said another way, the amount of data (probability distribution) that has been input and acquired by acquisition means 16, stored in memory means 18 is insufficient, such that the jitter decomposition module 12 cannot initially characterize the acquired data (i.e., determine that the probability distribution can be modeled as a known approximation). Nonetheless, the present inventors next discovered and determined that this problem could be solved by extrapolating the known approximation, such as the polynomial approximations used to model regions A and B, to model regions C and D as well.

As used herein, it should be understood that the term "low", as used in the phrase "low probability region" is meant to include both a "lower" probability region and "lowest" probability region.

In one embodiment of the invention, the PDFe 600 shown in FIG. 6 may be converted into the CDFe 700 shown in FIG. 7 using the identification and determining steps described above and below.

In yet more detail the identification and determination steps may be completed as follows. First, the controller 20 may be operable to access stored executable instructions from the memory means 18 that enable the controller 20 to identify data that has been input and acquired by acquisition means 16 and stored in memory means 18 representing regions A through D in FIG. 6. Continuing, again, even though the probability of occurrence of data in regions A-D is low, the amount of identified, acquired data (probability distribution) in regions A and B is sufficient enough for the controller 20, and in particular the jitter decomposition module 12, to process and determine that the probability distribution for regions A and B can be modeled as a known approximation, such as a polynomial approximation (e.g., a linear polynomial approximation with a slope of $1/\sigma$, having for example, a Gaussian distribution when depicted as a CDFe in Q-space), a model that can be extrapolated into regions C and D. Thus, in accordance with the present invention the controller 20 may be operable to first identify acquired data associated with low probability of occurrence in regions A through D of the PDFe estimate shown in FIG. 6., and then process the data in order to determine that the data can be modeled as (i.e., corresponds to) a known approximation, such as a polynomial approximation. Once the controller 20 has determined that the data within regions A-D may be so approximated, the controller 20 may be operable to generate an estimate of the PDFe in Q-space in the form of a CDFe. In particular, the controller 20 may be operable to generate an estimate CDFe 700 in FIG. 7. The estimate includes linear polynomial approximations with slopes of $1/\sigma$, having for example, Gaussian distributions (i.e., lines $m_1$ and $m_2$ in FIG. 7).

Figure 7:
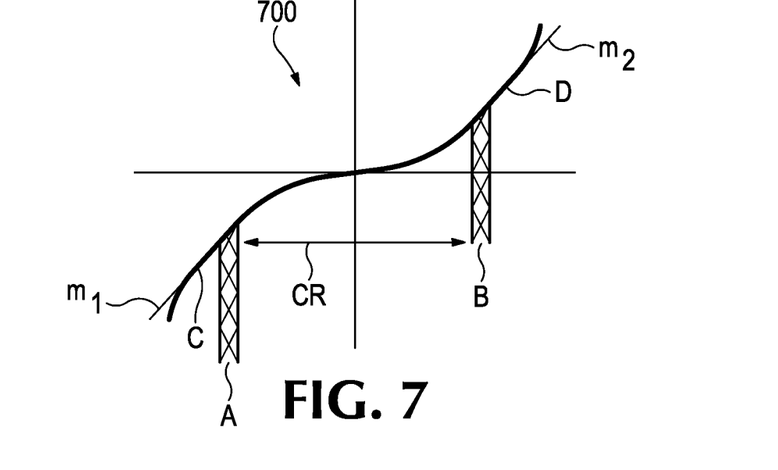
FIG. 7 is an estimated cumulative distribution function (CDFe) formed from the PDFe of FIG. 6 according to an embodiment of the present invention.

In an embodiment of the invention, to complete the identification and determination steps in the generation of the CDFe in FIG. 7, the controller 20 may be operable to access and execute stored instructions from memory means 18 and access acquired data from memory means 18. Further, to model the acquired data representing regions A-D as a linear polynomial approximation (e.g., straight lines $m_1$ and $m_2$ in FIG. 7), the controller 20 may be operable to access and execute stored instructions in memory means 18 and acquired and unacquired data (e.g., data based on a stored model) from memory means 18 that represent a known probability distribution, for example a linear polynomial approximation having a Gaussian distribution.

CDFe 700 depicted in FIG. 7 represents an intermediate CDFe that may be generated by the controller 20.

Regarding steps (c) and (d) above, once the present inventors discovered that regions A-D of the PDFe 600 estimate in FIG. 6 could be modeled as known approximations, such as linear polynomial approximations using, for example, the Q-space CDFe 700 in FIG. 7, the inventors then discovered a way to complete this modeling. In an embodiment of the invention, regions A-D of PDFe 600 in FIG. 6 or regions modeled by the lines $m_1$ and $m_2$ in FIG. 7 may be truncated or otherwise removed and replaced by such known approximations.

Figure 8:
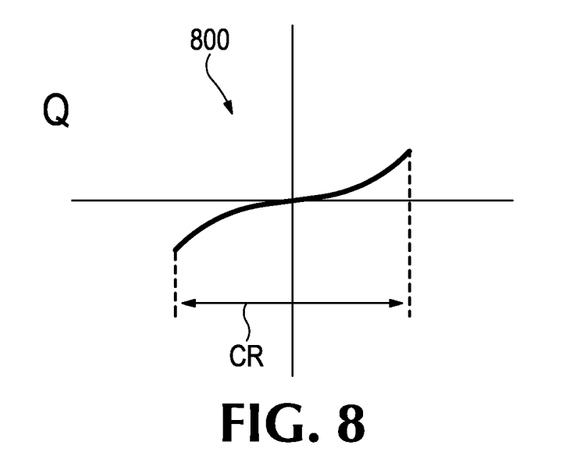
FIG. 8 is a truncated version of the CDFe of FIG. 7 according to an embodiment of the present invention.

FIG. 8 depicts another intermediate CDFe estimate that may be generated by the controller 20 upon truncation of the low probability regions of the CDFe estimate 700 in FIG. 7.

FIG. 9 depicts yet another intermediate CDFe estimate that may be generated by the controller 20 upon replacement of the low probability regions with "spliced in" known approximations, such as linear polynomial approximation regions having, for example, Gaussian distributions.

In more detail, in an embodiment of the invention to complete the truncation and replacement steps, the controller 20 may be operable to execute instructions from memory means 18 to first truncate or remove the acquired data representing the low probability regions and then replace the truncated regions with data that comprises a known approximation, such as polynomial approximations or linear polynomial approximations (when the impairments are displayed in a Q-space, CDFe) where the approximations may be extrapolated into the lowest probability regions. It should be understood that the data corresponding to the known approximation (e.g., best fits lines $m_1$ and $m_2$) may be generated by the controller 20 based on the acquired data and unacquired or generated data that fits a known probability model that is used to estimate an actual probability distribution of impairments in the lower and lowest probability regions. (e.g., best fit curves of polynomial approximations that may be stored in memory means 18 and accessed by controller 20).

It should be noted that while the low probability regions in FIG. 6 are located at extremes (left and right) of the compound distribution, such regions may be located elsewhere and still be identified, truncated and replaced as described herein. Further, it should be understood that the known approximation may be extrapolated to extremes of a specified probability (i.e., a specified BER).

Figure 10:
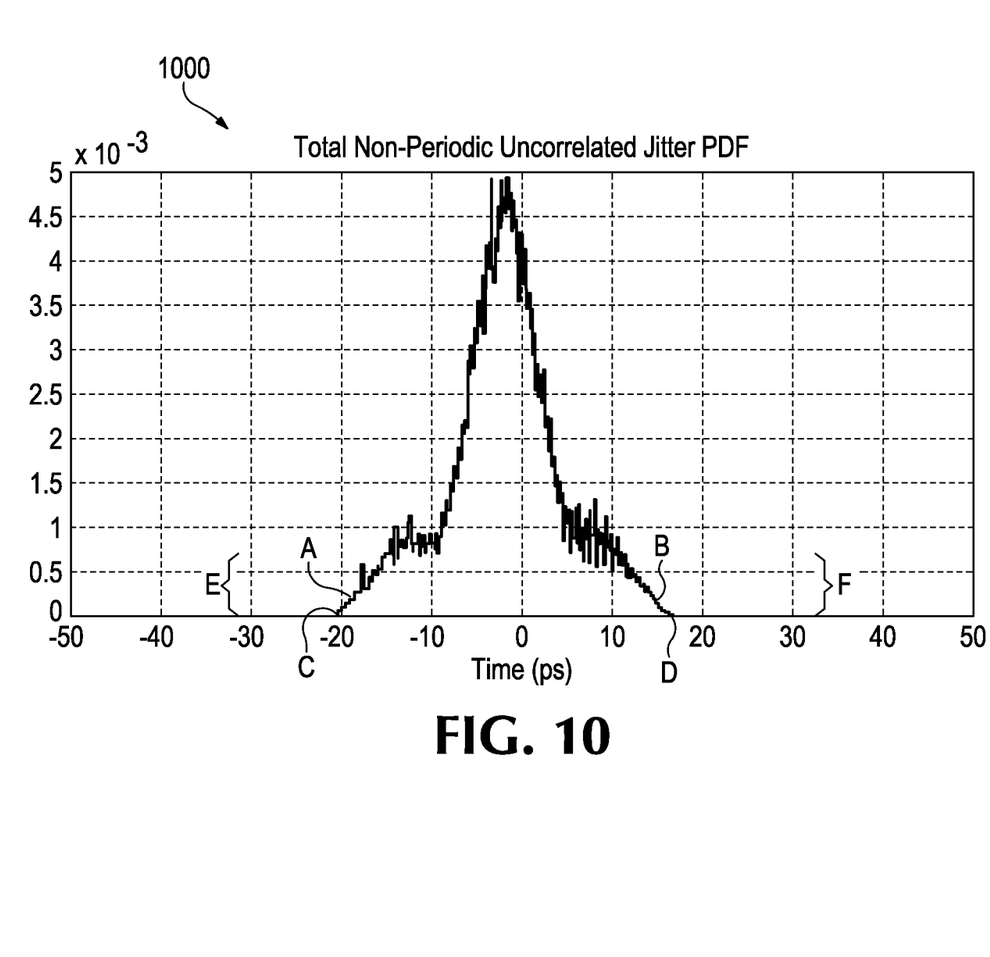
FIG. 10 is a PDFe formed from the CDFe of FIG. 9 according to an embodiment of the present invention.

Because PDFs are traditionally used, in an alternative embodiment of the invention the CDFe shown in FIG. 9 may be converted to a modified PDF 1000, as shown in FIG. 10. It should be understood that the modified PDF 1000 shown in FIG. 10 may be generated by the controller 20 using executed instructions and acquired and unacquired data generated by controller 20 and/or stored within memory means 18. Further, it should be understood that the modified PDF 1000 includes known, ideal unbound distribution regions (polynomial approximation regions) E, F (associated with regions A, C and B, D respectively) instead of the low probability regions. Such a modified PDF estimate 1000 may be viewed as partially a PDF (in low probability regions) and partially a PDFe (in the central, high probability region), where this estimate has the property of closely matching the convolution of an ideal PDF with a bound PDFe.

In accordance with an embodiment of the invention, an accurate estimate of total jitter (RJ) may be generated by convolving the modified PDFe shown in FIG. 10 with a PDF of data-dependent deterministic components (as represented in FIG. 5, for example) in order to measure total jitter at bit error rate (TJ @ BER) using the controller 20 in conjunction with the memory means 18.

Figure 11:
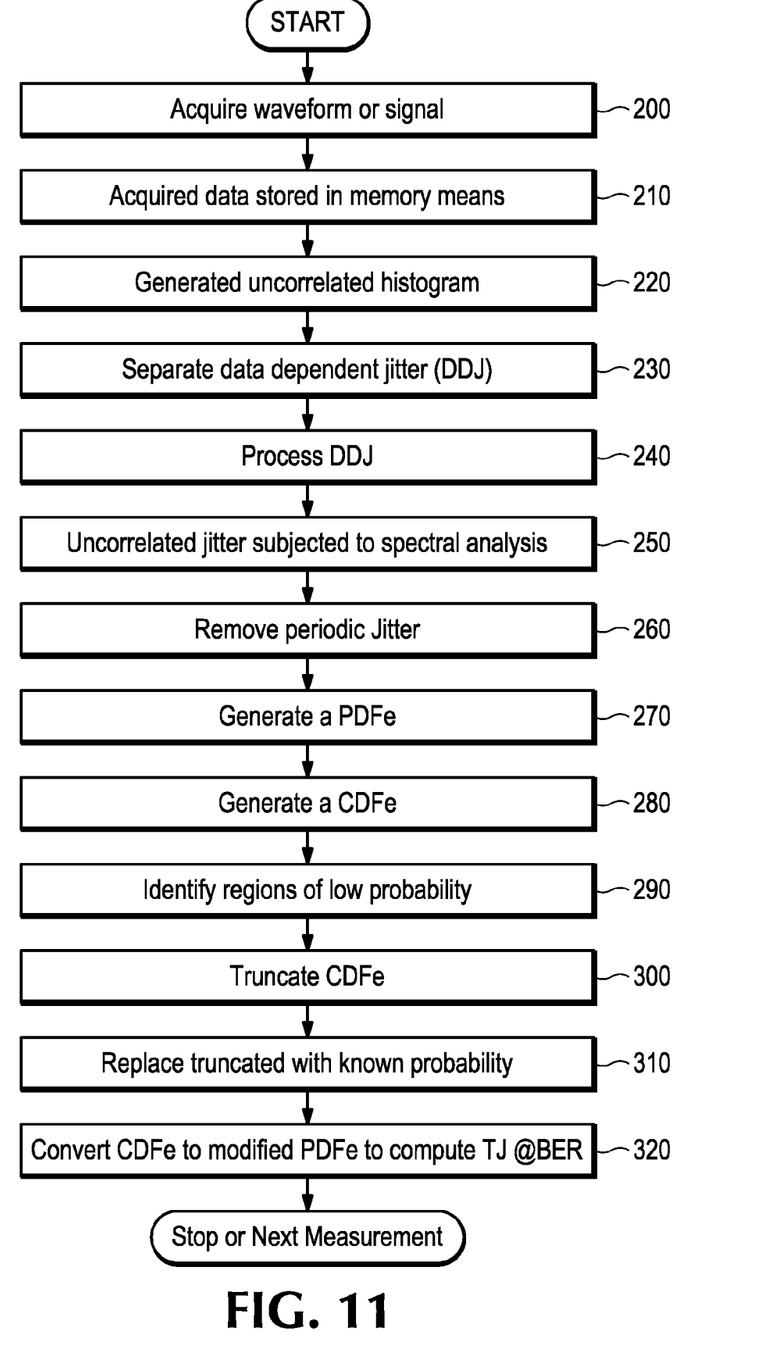
FIG. 11 is a high level flow diagram according to embodiments of the present invention.

FIG. 11 depicts a simplified flow diagram that summarizes the elements of the embodiments described above.

An exemplary method begins at step 200, where an analog input waveform or signal is input into oscilloscope 10, for example, and acquired by acquisition means 16. At step 210, acquired data (e.g., one or more data patterns 24) representing the input signal may be stored in memory means 18. At step 220, an uncorrelated jitter histogram may be generated from the acquired data. At step 230, data dependent jitter may be separated from uncorrelated jitter using one or more known techniques (e.g., spectral, averaging, or the like), and then processed using known techniques in step 240.

In accordance with the present invention, the remaining uncorrelated jitter is further decomposed to separate the bounded uncorrelated jitter (BUJ) from random jitter. For example, the uncorrelated jitter component may be subjected to a spectral analysis at step 250 to remove the periodic component at step 260, which may be analyzed in the time domain.

The remaining non-periodic component of the BUJ and the unbounded jitter may then be used to generate a compound distribution of these components, such as PDFe 600 in FIG. 6, at step 270. As set forth above, the non-periodic component of the BUJ and unbounded jitter is referred to as residual jitter.

Thereafter, a CDFe such as the intermediate CDFe 700 in FIG. 7 is generated in step 280. Next, regions of low probability may be identified in step 290, and determined to be modeled as known approximations, such as linear polynomial approximations in step 290, as shown in the intermediate Q-space CDFe 700 in FIG. 7.

The low probability regions are truncated (i.e., removed) in step 300 as shown in the CDFe 800 in FIG. 8. The truncated, low probability regions are replaced with known, ideal, unbound distribution functions (polynomial approximation (s)) in step 310, as shown by the CDFe 900 in FIG. 9. The polynomial approximations may be linear polynomial approximations having Gaussian distributions when depicted in Q-space as a CDFe. The truncation includes replacement of lower probability regions with a model, known approximation and replacement of lowest probability regions with extrapolations or extensions of the known approximations that correspond to specified bit error rates.

The CDFe may then be converted to a modified PDF that has a distribution that is partially a PDF (in low probability areas), and a PDFe in the remaining, high probability areas in step 320, as shown by the modified PDF 1000 in FIG. 10.

Although particular embodiments of the invention have been described, it will be appreciated that the principles of the present invention are not limited to these embodiments. For example, while shown as being at the end portions of a PDFe or CDFe estimate, it should be understood that low probability regions may also be found at other locations. These regions are defined as locations where the distribution has already reached the shape of an estimated distribution function. Further, other predictable or known approximations, other than linear polynomial approximations with Gaussian distributions, may be used to model the low probability regions. Still further, though the above embodiments focused on analyzing uncorrelated jitter that included non-periodic components it should be understood that the same or substantially same methodologies and systems may be used or modified to include periodic components as well and still fall within the scope of the present invention. Yet other variations and modifications may be made without departing from the principles of the invention as set forth in the following claims.

We claim:

1. An oscilloscope for estimating a probability density function (PDF) for non-periodic, uncorrelated jitter comprising:
   control means operable to execute instructions for modifying a compound distribution representing acquired data that comprises non-periodic, uncorrelated jitter by:
      identifying low probability regions in the compound distribution;
      identifying a known approximation that models a distribution of at least a first portion of the low probability regions;
      removing the low probability regions; and
      replacing the removed low probability regions with the known approximation and an extrapolation of the known approximation;
   a user interface for activating signal impairment analysis, and for indicating when the analysis is completed; and
   a display unit for displaying the user interface.

2. The oscilloscope as in claim 1, wherein the control means is further operable to execute instructions for:
   generating a cumulative distribution function (CDF) estimate based on the compound distribution, where the known approximation comprises a linear polynomial approximation having a Gaussian distribution in Q space;
   converting the CDF estimate into a modified PDF distribution, and
   generating an accurate estimate of total jitter by convolving the modified PDF distribution with a data-dependent deterministic PDF in order to calculate a total jitter distribution and a total jitter value at a specified bit error rate.

* * * * *